United States Patent
Zhang et al.

(10) Patent No.: US 9,535,588 B2
(45) Date of Patent: Jan. 3, 2017

(54) METHOD AND DEVICE FOR UNLOCKING TOUCH SCREEN

(75) Inventors: Shengge Zhang, Shenzhen (CN); Lina Wang, Shenzhen (CN); Yong Zhu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 274 days.

(21) Appl. No.: 14/379,393

(22) PCT Filed: May 7, 2012

(86) PCT No.: PCT/CN2012/075150
§ 371 (c)(1),
(2), (4) Date: Aug. 18, 2014

(87) PCT Pub. No.: WO2013/123726
PCT Pub. Date: Aug. 29, 2013

(65) Prior Publication Data
US 2015/0046885 A1 Feb. 12, 2015

(30) Foreign Application Priority Data
Feb. 23, 2012 (CN) .......................... 2012 1 0041798

(51) Int. Cl.
G06F 3/0484 (2013.01)
G06F 3/0488 (2013.01)
G06F 3/0481 (2013.01)

(52) U.S. Cl.
CPC ......... *G06F 3/04847* (2013.01); *G06F 3/0481* (2013.01); *G06F 3/0484* (2013.01);
(Continued)

(58) Field of Classification Search
CPC ... G06F 3/04847; G06F 3/0481; G06F 3/0484
See application file for complete search history.

(56) References Cited

U.S. PATENT DOCUMENTS

2007/0150842 A1 6/2007 Chaudhri
2008/0122796 A1 5/2008 Jobs
(Continued)

FOREIGN PATENT DOCUMENTS

CN 101957715 A 1/2011
CN 102314295 A 1/2012
(Continued)

OTHER PUBLICATIONS

Supplementary European Search Report in European application No. 12869546.7, mailed on Jan. 20, 2015.
(Continued)

*Primary Examiner* — Li Sun
(74) *Attorney, Agent, or Firm* — Oppedahl Patent Law Firm LLC

(57) ABSTRACT

Disclosed is a method for unlocking a touch screen, including that: an unlocking gesture and a screen transition in unlocking are preset, wherein the screen transition is as follows: a screen is turned along an axis on the screen to produce a visual effect similar to that of pushing open a revolving door, such that a lock screen is turned gradually from the front of the screen to the back of the screen, and an unlocked screen is turned gradually from the back of the screen to the front of the screen; the screen is divided into two or more zones each corresponding to a distinct application; when the screen is unlocked in such a zone, the unlocked screen is an interface of an application corresponding to the zone; and when the screen has to be unlocked, the unlocking gesture is performed on the screen to unlock the screen. With the technical solution, efficiency in unlocking a touch screen and user experience may be improved significantly. Also disclosed is a device for unlocking a touch screen including an unlocking gesture setting module, a
(Continued)

screen transition setting module, a screen dividing module, and an unlocking module.

12 Claims, 5 Drawing Sheets

(52) U.S. Cl.
CPC ........ *G06F 3/0488* (2013.01); *G06F 3/04842* (2013.01); *G06F 3/04883* (2013.01); *G06F 2203/04802* (2013.01); *G06F 2203/04803* (2013.01)

(56) References Cited

U.S. PATENT DOCUMENTS

| | | |
|---|---|---|
| 2008/0174570 A1 | 7/2008 | Jobs |
| 2009/0241072 A1 | 9/2009 | Chaudhri |
| 2010/0020035 A1* | 1/2010 | Ryu .................... G06F 3/04883 345/173 |
| 2010/0248689 A1 | 9/2010 | Teng et al. |
| 2011/0072400 A1 | 3/2011 | Watanabe et al. |
| 2011/0096006 A1* | 4/2011 | Jeong .................... G06F 3/0488 345/173 |
| 2011/0296356 A1 | 12/2011 | Chaudhri |
| 2011/0300831 A1 | 12/2011 | Chin |
| 2012/0007836 A1 | 1/2012 | Wu |
| 2012/0023458 A1 | 1/2012 | Chaudhri |
| 2012/0044173 A1 | 2/2012 | Homma |
| 2012/0216139 A1 | 8/2012 | Ording |
| 2012/0293438 A1 | 11/2012 | Chaudhri |
| 2013/0055169 A1* | 2/2013 | Wright .................... H04M 1/67 715/863 |
| 2013/0102366 A1 | 4/2013 | Teng et al. |
| 2013/0185677 A1 | 7/2013 | Chaudhri et al. |
| 2013/0185678 A1 | 7/2013 | Chaudhri et al. |
| 2013/0185680 A1 | 7/2013 | Chaudhri et al. |
| 2013/0190056 A1 | 7/2013 | Chaudhri et al. |
| 2014/0327629 A1 | 11/2014 | Jobs et al. |

FOREIGN PATENT DOCUMENTS

| | | |
|---|---|---|
| CN | 102368796 A | 3/2012 |
| EP | 2420925 A2 | 2/2012 |
| WO | 2010117642 A2 | 10/2010 |
| WO | 2011037366 A2 | 3/2011 |

OTHER PUBLICATIONS

International Search Report in international application No. PCT/CN2012/075150, mailed on Nov. 22, 2012. (2 pages—see entire document).

English Translation of the Written Opinion of the International Search Authority in international application No. PCT/CN2012/075150, mailed on Nov. 22, 2012. (6 pages—see entire document).

* cited by examiner

METHOD AND DEVICE FOR UNLOCKING TOUCH SCREEN

TECHNICAL FIELD

The disclosure relates to touch screen technology, and more particularly to a method and device for unlocking a touch screen.

BACKGROUND

With the advance of electronic technology, more and more touch screens are used in electronic equipments, in particular in mobile electronic equipments, such as mobile phones, tablet computers, etc. In order to save power and avoid misoperation, an electronic equipment with a touch screen is typically provided with a screen locking-unlocking function. Currently, there are mainly two kinds of unlocking solutions for most touch equipments, one is to unlock a screen by inputting a password, which is a relatively complicated process that requires a longer period of time to recall and enter the password. The other is to unlock a screen by a sliding movement on the screen, which requires presetting a sliding zone and a sliding path for a user and providing a path direction prompt, where the user is provided with a small unlocking zone and less freedom, and is required to think and learn in using such an unlocking solution.

The primary goal of unlocking a mobile phone is to use the mobile phone, so there is a need for a faster, simpler, less restrictive, and more user-intuitive unlocking solution.

SUMMARY

It is desired that embodiments of the disclosure provide a touch screen user with a faster, simpler, less restrictive, and more user-intuitive unlocking solution, so as to improve usability and user experience of an electronic equipment.

The principle of the disclosure is as follows.

As a daily facility, a revolving door can bring, upon a gentle push, people from one space to another space; meanwhile, the side inside the door turns to be outside. In view of this, we can envision a screen of a mobile phone as a device similar to a revolving door. The front side of the screen is a lock screen, the back side of the screen is an unlocked screen (which may be a standby interface, an interface before exit, or an interface of an application preset by the lock screen). The screen, which is in a lock screen state and is brightened up, may be unlocked by flipping an interface at the back of the screen to the front along an axis in the middle of the screen using a certain gesture, including but not limited to: two single clicks, a double click, a long press, a sliding movement perpendicular to the axis (with an angle deviation allowed), and the like.

Accordingly, a technical solution of the disclosure is implemented as follows.

A method for unlocking a touch screen, includes steps of:
presetting an unlocking gesture;
presetting a screen transition in unlocking, wherein the screen transition includes: turning a screen along an axis on the screen, such that a lock screen is turned gradually from the front of the screen to the back of the screen, and an unlocked screen is turned gradually from the back of the screen to the front of the screen; and
detecting a screen-clicking gesture, and upon detection of a screen-clicking gesture of the unlocking gesture, unlocking the screen according to the preset screen transition in unlocking.

In an embodiment, the unlocking gesture may be one of the following operations:
two single clicks, a double click, a long press, and a sliding movement perpendicular to the axis.

In an embodiment, the method may further include steps of: when the screen is in a lock screen state and is brightened up, upon detecting that the screen is clicked on once, turning the lock screen by a small angle, prompting a user of a way to unlock the screen, and restoring the lock screen gradually when no operation is performed by the user within a preset period of time.

In an embodiment, the step of turning a screen along an axis on the screen may be: turning the screen to the right when the screen-clicking gesture is performed on a zone to the right of the axis, or turning the screen to the left when the screen-clicking gesture is performed on a zone to the left of the axis.

In an embodiment, the method may further include steps of:
dividing the screen into N zones, wherein the N is a natural number greater than or equal to 2; presetting the N zones to each correspond to one of N different applications; and when the unlocking gesture is performed in one of the N zones, setting the unlocked screen as an interface of an application corresponding to the one of the N zones.

A device for unlocking a touch screen, includes: an unlocking gesture setting module, a screen transition setting module, and an unlocking module, wherein
the unlocking gesture setting module is configured for presetting an unlocking gesture;
the screen transition setting module is configured for presetting a screen transition in unlocking, wherein the screen transition includes: turning a screen along an axis on the screen, such that a lock screen is turned gradually from the front of the screen to the back of the screen, and an unlocked screen is turned gradually from the back of the screen to the front of the screen; and
the unlocking module is configured for detecting a screen-clicking gesture, and upon detection of a screen-clicking gesture of the unlocking gesture, unlocking the screen according to the preset screen transition in unlocking.

In an embodiment, the unlocking gesture may be one of the following operations:
two single clicks, a double click, a long press, and a sliding movement perpendicular to the axis.

In an embodiment, the screen transition setting module may be further configured for presetting a screen transition of: when the screen is in a lock screen state and is brightened up, upon detecting that the screen is clicked on once, turning the lock screen by a small angle, prompting a user of a way to unlock the screen, and restoring the lock screen gradually when no operation is performed by the user within a preset period of time.

In an embodiment, the screen transition setting module may be configured for presetting to turn the screen to the right when the screen-clicking gesture is performed on a zone to the right of the axis, or to turn the screen to the left when the screen-clicking gesture is performed on a zone to the left of the axis.

In an embodiment, the device may further include a screen dividing module for: dividing the screen into N zones, wherein the N is a natural number greater than or equal to 2; presetting the N zones to each correspond to one of N different applications; and when the unlocking gesture is performed in one of the N zones, setting the unlocked screen as an interface of an application corresponding to the one of the N zones.

Compared to the prior art, the method and device for unlocking a touch screen according to the disclosure conform to people's daily life habits, and are more intuitive; with the disclosure, no operation path is defined, and there may be various operation gestures, leading to less limitation, providing more freedom as well as adaptation to a left-handed user, such that efficiency in unlocking a touch screen may be improved, thus leading to enhanced user experience.

DETAILED DESCRIPTION

Clear, complete description of a technical solution of an embodiment of the disclosure is given with reference to a drawing of the embodiment. Embodiments described are merely part of, instead of all, embodiments of the disclosure. Any other embodiment obtained by those skilled in the art without any inventive effort falls within the scope of protection of the disclosure.

In order to solve an existing problem in the prior art, the disclosure provides a method and device for unlocking a touch screen, offering a touch screen user a faster, simpler, less restrictive, and more user-intuitive unlocking solution.

To clearly illustrate the disclosure, a technical solution of the disclosure is described with both method and device embodiments.

Embodiment 1

Figure 1:
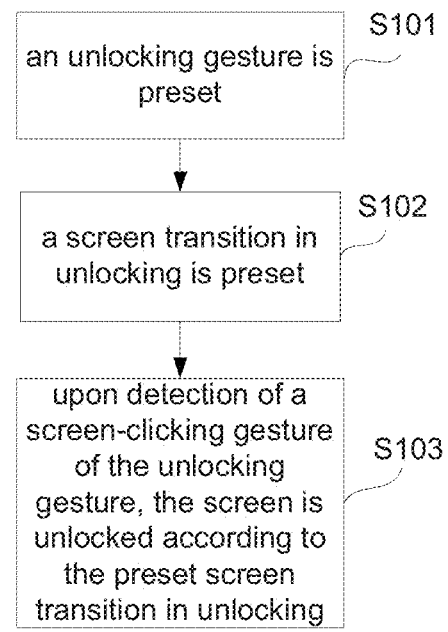
FIG. 1 is a flowchart of a method for unlocking a touch screen according to Embodiment 1 of the disclosure.

The present embodiment provides a method for unlocking a touch screen. As shown in FIG. 1, the method includes steps as follows.

In step S101, an unlocking gesture is preset.

in this step, the preset unlocking gesture includes but is not limited to the following operations:

two single clicks, a double click, a long press, and a sliding movement perpendicular to the axis, where said sliding movement is allowed to have an angle deviation.

In step S102, a screen transition in unlocking is preset as follows: a screen is turned along an axis on the screen starting from a lock screen, to produce a visual effect of turning the lock screen gradually from the front of the screen to the back of the screen, and turning an unlocked screen gradually from the back of the screen to the front of the screen.

Figure 2:
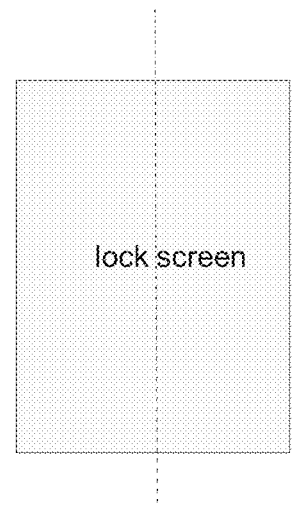
FIG. 2 is a schematic diagram of a lock screen according to an embodiment of the disclosure.

In this embodiment, the lock screen is as shown in FIG. 2. When the screen is in a lock screen state and is brightened up, an axis in the middle of the screen, i.e. the dash-dotted line shown in FIG. 2, divides the screen into two zones.

In this embodiment, the screen may be turned to different directions depending on where a hand touches the screen, The screen is turned to the right when the screen-clicking gesture is performed on a zone to the right of the axis, or to the left when the screen-clicking gesture is performed on a zone to the left of the axis.

Figure 3:
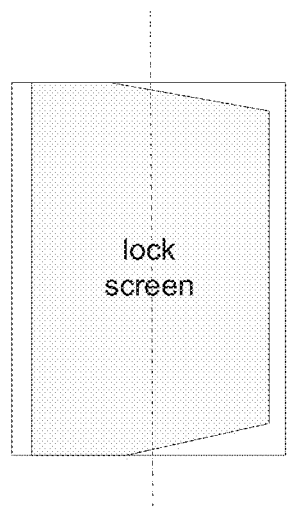
FIG. 3 is a schematic diagram of a small-angle turn of a lock screen upon a click on the screen in a zone to the right of an axis according to an embodiment of the disclosure.
Figure 4:
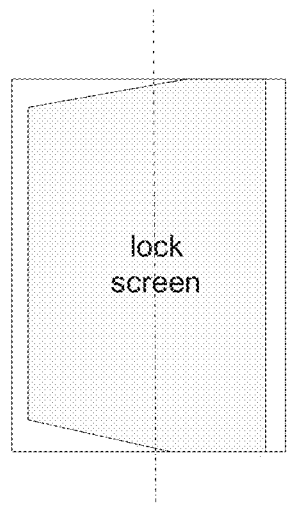
FIG. 4 is a schematic diagram of a small-angle turn of a lock screen upon a click on the screen in a zone to the left of an axis according to an embodiment of the disclosure.

As shown in FIG. 3, in the state of FIG. 2, upon a click on the zone to the right of the axis, the lock screen may be turned to the right by a small angle. As shown in FIG. 4, in the state of FIG. 2, upon a click on the zone to the left of the axis, the lock screen may be turned to the left by a small angle. This Small-angle turn serves to prompt a user of a way to unlock the screen. The lock screen may be restored gradually when no move is made by the user within a preset period of time.

In step S103, upon detection of a screen-clicking gesture of the unlocking gesture, the screen is unlocked according to the preset screen transition in unlocking.

Figure 5:
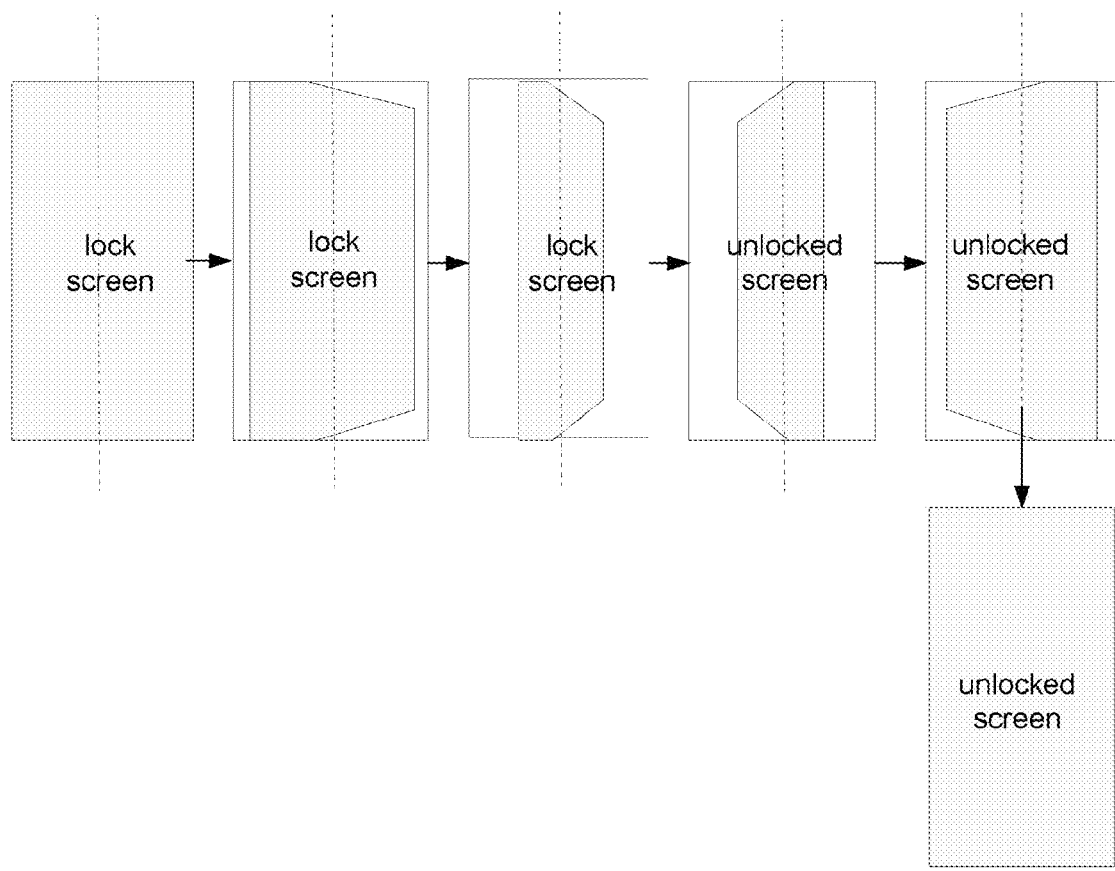
FIG. 5 is a schematic diagram of a screen flip when unlocking is performed in a zone to the right of the screen according to an embodiment of the disclosure.

As shown in FIG. 5, in the state of FIG. 2, when unlocking is performed on the right zone of the screen, for example when two single clicks, a double click, a sliding movement perpendicular to the imaginary axis, or the like, is detected, the screen is turned smoothly from right to left. After the screen is turned over, the unlocked screen is displayed on the screen, and the screen is unlocked.

Embodiment 2

The present embodiment is a specific embodiment of the method described in Embodiment 1. Based on the method described in Embodiment 1, the screen is divided into N zones, wherein the N is a natural number greater than or equal to 2; the N zones is preset to each correspond to one of N different applications; and when the unlocking gesture is performed in one of the N zones, the unlocked screen is set as an interface of an application corresponding to the one of the N zones. Embodiment 2 is further elaborated below with N=2.

Figure 6:
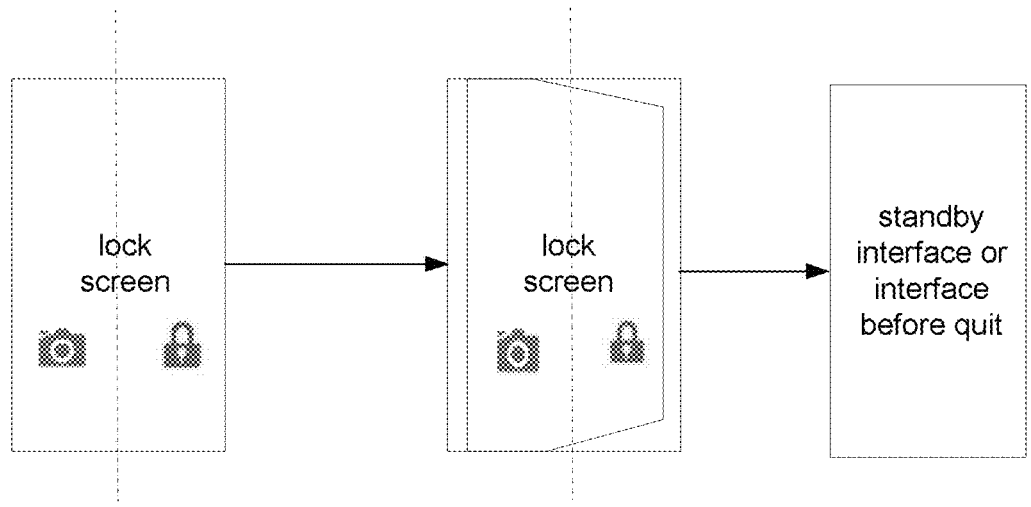
FIG. 6 is a flowchart of performing unlocking in a zone to the right of an axis when the screen is divided into two zones according to an embodiment of the disclosure.
Figure 7:
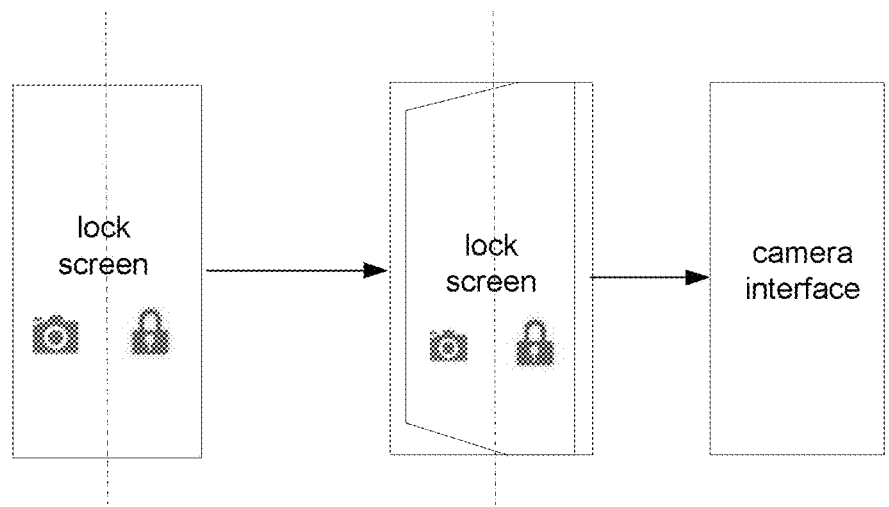
FIG. 7 is a flowchart of performing unlocking in a zone to the left of an axis when the screen is divided into two zones according to an embodiment of the disclosure.

The basic steps of this embodiment are similar to those of Embodiment 1, and are not repeated herein. Embodiment 2 differs from Embodiment 1 in that, the screen is divided into two zones. The unlocked screen may be different depending on which one of the two zones unlocking is performed in. The left zone of the screen is set to correspond to a camera application, and the right zone of the screen is set to correspond to a general unlocking zone. As shown in FIG. 6, when unlocking is performed in the right zone of the screen, the unlocked screen may be a standby interface or interface before quit; As shown in FIG. 7, when unlocking is performed in the left zone of the screen, the unlocked screen may be a camera interface.

As can be seen from the technical solutions of Embodiment 1 and Embodiment 2, with the method provided by the disclosure, a screen transition in unlocking is preset to produce a visual effect similar to that of pushing open a revolving door, such that a lock screen is pushed to the back of the screen, and an unlocked screen is flipped from the back of the screen over to the front of the screen, such that a touch screen user is provided with a faster, simpler, less restrictive, and more user-intuitive unlocking solution, improving usability and user experience of an electronic equipment.

Embodiment 3

Figure 8:
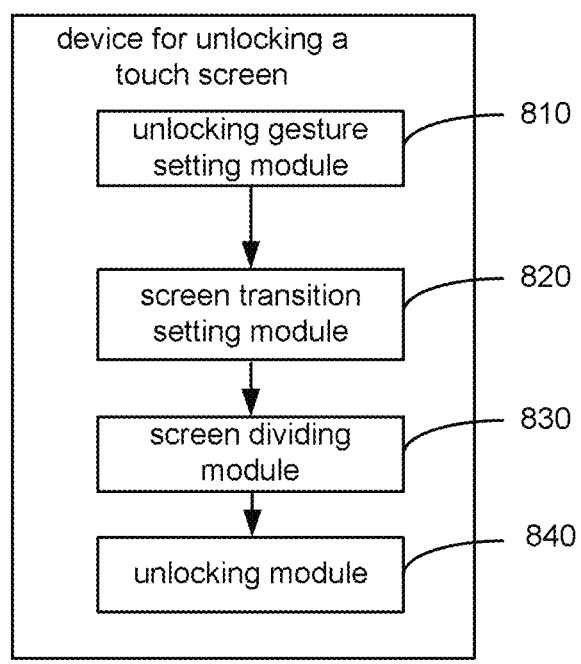
FIG. 8 is a block diagram of a structure of a device for unlocking a touch screen according to Embodiment 2 of the disclosure.

The present embodiment provides a device for unlocking a touch screen. As shown in FIG. 8, the device includes an unlocking gesture setting module 810, a screen transition setting module 820, and an unlocking module 840; and may further include a screen dividing module 830.

The unlocking gesture setting module 810 is configured for presetting an unlocking gesture.

The unlocking gesture preset by the unlocking gesture setting module may include, but is not limited to operations of:

two single clicks, a double click, a long press, and a sliding movement perpendicular to the axis (with an angle deviation allowed).

The screen transition setting module 820 is configured for: presetting a screen transition in unlocking as turning a screen along an axis on the screen, such that a lock screen is turned gradually from the front of the screen to the back of the screen, and an unlocked screen is turned gradually from the back of the screen to the front of the screen; and when the screen is in a lock screen state and is brightened up, upon a click on the screen, turning the lock screen by a small angle to prompt a user of a way to unlock the screen, and restoring the lock screen gradually when no operation is performed by the user within a preset period of time.

In this embodiment, the screen may be turned to different directions depending on where a hand touches the screen, The screen is turned to the right when the screen-clicking gesture is performed on a zone to the right of the axis, or to the left when the screen-clicking gesture is performed on a zone to the left of the axis.

The screen dividing module 830 may be configured for: dividing the screen into N zones, where the N is a natural number greater than or equal to 2; presetting the N zones to each correspond to one of N different applications; and when the unlocking gesture is performed in one of the N zones, setting the unlocked screen as an interface of an application corresponding to the one of the N zones.

The unlocking module 840 is configured for detecting a screen-clicking gesture, and upon detection of a screen-clicking gesture of the unlocking gesture, unlocking the screen according to the preset screen transition in unlocking.

With the device for unlocking a touch screen provided by the disclosure, by introducing a screen transition setting module, a screen transition in unlocking is preset to produce a visual effect similar to that of pushing open a revolving door, such that a touch screen user is provided with a faster, simpler, less restrictive, and more user-intuitive unlocking solution, improving usability and user experience of an electronic equipment.

The above description illustrates and describes embodiments of the present disclosure, however as mentioned above, it should be understood that the present disclosure is not limited to the forms disclosed herein; the forms should not be construed as exclusion of other embodiments, but may apply to various other combinations, modifications and contexts, and can be altered according to the above teaching or techniques or knowledge in related art within the scope of the present disclosure. Any modification or alteration made by the skilled in the art without departing form the spirit and scope of the present disclosure should fall in the protection scope of the appended claims of the present disclosure.

The invention claimed is:

1. A method for unlocking a touch screen, comprising steps of:
   presetting an unlocking gesture;
   presetting a screen transition in unlocking, wherein the screen transition comprises: turning a screen along an axis on the screen, such that a lock screen is turned gradually from the front of the screen to the back of the screen, and an unlocked screen is turned gradually from the back of the screen to the front of the screen; and
   detecting a screen-clicking gesture of the unlocking gesture, and upon detection of the screen-clicking gesture, unlocking the screen according to the preset screen transition in unlocking,
   wherein the method further comprises steps of: when the screen is in a lock screen state, upon detecting that the screen is clicked on once, brightening UP the screen and turning the lock screen by a small angle, prompting a user to perform the unlocking gesture to unlock screen, and restoring the lock screen gradually when no operation is performed by the user within a preset period of time.

2. The method according to claim 1, wherein the unlocking gesture is one of the following operations:
   two single clicks, a double click, a long press, and a sliding movement perpendicular to the axis.

3. The method according to claim 2, further comprising steps of:
   dividing the screen into N zones, wherein the N is a natural number greater than or equal to 2; presetting the N zones to each correspond to one of N different applications; and when the unlocking gesture is performed in one of the N zones, setting the unlocked screen as an interface of an application corresponding to the one of the N zones.

4. The method according to claim 1, wherein the step of turning a screen along an axis on the screen is: turning the screen to the right when the screen-clicking gesture is performed on a zone to the right of the axis, or turning the screen to the left when the screen-clicking gesture is performed on a zone to the left of the axis.

5. The method according to claim 4, further comprising steps of:
   dividing the screen into N zones, wherein the N is a natural number greater than or equal to 2; presetting the N zones to each correspond to one of N different applications; and when the unlocking gesture is performed in one of the N zones, setting the unlocked screen as an interface of an application corresponding to the one of the N zones.

6. The method according to claim 1, further comprising steps of:
   dividing the screen into N zones, wherein the N is a natural number greater than or equal to 2; presetting the N zones to each correspond to one of N different applications; and when the unlocking gesture is performed in one of the N zones, setting the unlocked screen as an interface of an application corresponding to the one of the N zones.

7. A device for unlocking a touch screen, comprising:
   at least one hardware processor:
   a non-transitory computer-readable medium storing computer readable instruction, the instructions being executable by the at least one hardware processor for:
   presetting a screen transition in unlocking, wherein the screen transition comprises: turning a screen along an axis on the screen, such that a lock screen is turned gradually from the front of the screen to the back of the screen, and an unlocked screen is turned gradually from the back of the screen to the front of the screen; and detecting a screen-clicking gesture of the unlocking gesture, and upon detection of the screen-clicking gesture, unlocking the screen according to the preset screen transition in unlocking, wherein the instructions are further executable by the at least one hardware processor for: when the screen is in a lock screen state, upon detecting that the screen is clicked on once, brightening UP the screen and turning the lock screen by a small angle, prompting a user to perform the unlocking gesture to unlock the screen, and restoring the lock screen gradual when no operation is performed by the user within a preset period of time.

8. The device according to claim 7, wherein the unlocking gesture is on of the following operations:

two single clicks, a double click, a long press, and a sliding movement perpendicular to the axis.

9. The device according to claim 8, wherein the turning a screen along an axis on the screen is: turning the screen to the right when the screen-clicking gesture is performed on a zone to the right of the axis, or turning the screen to the left when the screen-clicking gesture is performed on a zone to the left of the axis.

10. The device according to claim 8, wherein the instructions are further executable by the at least one hardware processor for: dividing the screen into N zones, wherein the N is a natural number greater than or equal to 2; presetting the N zones to each correspond to one N different applications; and when the unlocking gesture is performed in one of the zones, setting the unlocked screen as an interface of an application corresponding the one of the N zones.

11. The device according to claim 7, wherein the turning screen along an axis on the screen is: turning the screen to the right when the screen-clicking gesture is performed on a zone to the right of the axis, or turning the screen to the left when the screen-clicking gesture is performed on a zone to the left of the axis.

12. The device according to claim 7, wherein the instructions are further executable by the at least one hardware processor for: dividing the screen into N zones, wherein the N is a natural number greater than or equal to 2; presetting the N zones to each correspond to one of N different applications; and when the unlocking gesture is performed in one of the N zones, setting the unlocked screen as an interface of an application corresponding to the one of the N zones.

* * * * *